(12) United States Patent
Gehringer et al.

(10) Patent No.: US 7,827,408 B1
(45) Date of Patent: Nov. 2, 2010

(54) DEVICE FOR AND METHOD OF AUTHENTICATED CRYPTOGRAPHY

(75) Inventors: Nicholas E. Gehringer, Jessup, MD (US); Patricia P. Greene, Columbia, MD (US)

(73) Assignee: The United States of America as represented by the Director of the National Security Agency, Washington, DC (US)

( * ) Notice: Subject to any disclaimer, the term of this patent is extended or adjusted under 35 U.S.C. 154(b) by 783 days.

(21) Appl. No.: 11/825,934

(22) Filed: Jul. 10, 2007

(51) Int. Cl.
*H04L 9/32* (2006.01)

(52) U.S. Cl. .................. 713/170; 380/259

(58) Field of Classification Search ........... 713/170; 380/259
See application file for complete search history.

(56) References Cited

U.S. PATENT DOCUMENTS

| | | | | |
|---|---|---|---|---|
| 6,396,928 B1 * | 5/2002 | Zheng | ................. | 380/285 |
| 6,829,355 B2 * | 12/2004 | Lilly | ................. | 380/28 |
| 6,912,284 B1 * | 6/2005 | Palmatier | ................. | 380/44 |
| 6,963,976 B1 * | 11/2005 | Jutla | ................. | 713/181 |
| 6,973,187 B2 * | 12/2005 | Gligor et al. | ................. | 380/28 |
| 7,046,802 B2 * | 5/2006 | Rogaway | ................. | 380/37 |
| 7,092,524 B1 * | 8/2006 | Timmel | ................. | 380/28 |
| 7,092,525 B2 * | 8/2006 | Matchett et al. | ................. | 380/29 |
| 7,200,227 B2 * | 4/2007 | Rogaway | ................. | 380/37 |
| 7,254,233 B2 * | 8/2007 | Hawkes et al. | ................. | 380/37 |
| 7,321,659 B2 * | 1/2008 | Hall et al. | ................. | 380/37 |
| 7,336,783 B2 * | 2/2008 | Park | ................. | 380/28 |
| 7,406,595 B1 * | 7/2008 | Boyle et al. | ................. | 713/160 |
| 7,418,100 B2 * | 8/2008 | McGrew et al. | ................. | 380/37 |
| 7,617,402 B2 * | 11/2009 | Shibata et al. | ................. | 713/193 |
| 7,623,656 B2 * | 11/2009 | Hawkes et al. | ................. | 380/42 |
| 7,697,681 B2 * | 4/2010 | Leech | ................. | 380/28 |
| 7,715,553 B2 * | 5/2010 | Smith et al. | ................. | 380/29 |
| 7,725,719 B2 * | 5/2010 | Sandberg et al. | ................. | 713/170 |
| 2004/0059572 A1 * | 3/2004 | Ivanic et al. | ................. | 704/236 |
| 2004/0252836 A1 * | 12/2004 | Yoshida et al. | ................. | 380/268 |
| 2006/0126835 A1 * | 6/2006 | Kim et al. | ................. | 380/44 |
| 2007/0189524 A1 * | 8/2007 | Rogaway | ................. | 380/37 |

(Continued)

OTHER PUBLICATIONS

Ben Lynn; Authenticated Identity-Based Encryption; Jun. 3, 2002.*
Dworkin, M.; "Recommendation for Block Cipher Modes of Operation: The CCM Mode for Authentication and Confidentiality"; NIST Special Publication 800-38C; May 2004; Gaithersbur.

(Continued)

*Primary Examiner*—Michael J Simitoski
*Assistant Examiner*—James Turchen
(74) *Attorney, Agent, or Firm*—Robert D. Morelli

(57) ABSTRACT

A device for and method of authenticated encryption by concatenating a first user-datum with a second datum, concatenating the first datum with a third datum, encrypting the results, concatenating the encrypted results, concatenating the result with a message and a fifth user-definable datum, hashing the result, concatenating the result with the message, dividing the result into blocks, concatenating the first datum with a sixth datum, generating key-stream blocks from the result using a block cipher in counter mode, combining the blocks and key-stream blocks, concatenating the result with the first datum and the fifth datum, and transmitting the result to a recipient. The recipient extracts the hash value from the received ciphertext, generates a hash value from the first through fifth datums and plaintext derived from the ciphertext, and compares the two. If they match then the plaintext and fifth datum are as the sender intended.

20 Claims, 4 Drawing Sheets

U.S. PATENT DOCUMENTS

2007/0286418 A1* 12/2007 Hall et al. .................... 380/37
2008/0084996 A1* 4/2008 Chen et al. .................... 380/28
2008/0172562 A1* 7/2008 Cachin et al. ............... 713/193

OTHER PUBLICATIONS

McGrew et al.; The Galois/Counter Mode of Operation (GCM); May 31, 2005.

* cited by examiner

DEVICE FOR AND METHOD OF AUTHENTICATED CRYPTOGRAPHY

FIELD OF INVENTION

The present invention relates, in general, to cryptography and, in particular, to a communication system using cryptography.

BACKGROUND OF THE INVENTION

Methods of encrypting a message are known. Methods of authenticating an encrypted message are known. However, the two methods are typically done separately. That is, a message is encrypted using one method. Then, a cryptographic hash of the message is generated using a second method. The hash is commonly referred to as a message authentication code (MAC). The encrypted message and the hash of the unencrypted message are sent to a recipient. The recipient decrypts the message, hashes the decrypted message using the same cryptographic hashing method used by the sender to hash the unencrypted message, and compares the hash received to the hash generated by the recipient. If the two hashes are identical then the recipient is assured that the message is as intended by the sender and was not modified by anyone else.

Since performing two methods is more time consuming than performing one method, people have attempted to create one method that accomplishes the goals of both encryption and authentication. Such methods are referred to as authenticated encryption methods.

U.S. Pat. No. 6,963,976, entitled "SYMMETRIC KEY AUTHENTICATED ENCRYPTION SCHEMES," is the first known authenticated encryption method. It discloses a device for and method of combining encryption and authentication by generating a random number; generating pseudo-random numbers from the random number using an encryption method and a first cryptographic key; generating a checksum from a message; encrypting the random number, the message, and the checksum using an encryption method and a second cryptographic key; combining the pseudo-random numbers with the encrypted message; and transmitting the combination of the pseudo-random numbers and the encrypted message. The present invention does not require the generation of a random number; the use of two encryption keys, the generation of pseudo-random numbers from a random number; the generation of a checksum from a message; the encryption of a random number, a message, and a checksum from the message; and the combining of pseudo-random numbers generated from a random number with an encrypted message. U.S. Pat. No. 6,963,976 is hereby incorporated by reference into the specification of the present invention.

U.S. Pat. Nos. 7,046,802 and 7,200,227, each entitled "METHOD AND APPARATUS FOR FACILITATING EFFICIENT AUTHENTICATED ENCRYPTION," each disclose a device for and method of combining encryption and authentication by generating two numbers; encrypting the two numbers to generate a series of numbers; generating a checksum from a message and encrypting it; combining the message with the series of numbers using an Exclusive-Or function (XOR); encrypting the combination of the message and the series of numbers; combining (i.e., XOR) the series of numbers with the encrypted message, and transmitting the result of the combination of the series of numbers and the encrypted message and the encrypted checksum. The present invention does not use separate encryption methods to encrypt two numbers and the message or generate a checksum from a message and encrypt it. U.S. Pat. Nos. 7,046,802 and 7,200,227 are hereby incorporated by reference into the specification of the present invention.

U.S. Pat. Appl. No. 20040059572, entitled "APPARATUS AND METHOD FOR QUANTITATIVE MEASUREMENT OF VOICE QUALITY IN PACKET NETWORK ENVIRONMENTS," discloses a device for and method of measuring voice quality by introducing noise into the voice signal, performing speech recognition on the signal containing noise. More noise is added to the signal until the signal is no longer recognized. The point at which the signal is no longer recognized is a measure of the suitability of the transmission channel. The present invention does not introduce noise into a voice signal as does U.S. Pat. Appl. No. 20040059572. U.S. Pat. Appl. No. 20040059572 is hereby incorporated by reference into the specification of the present invention.

National Institute of Standards and Technology (NIST) Special Publication 800-38C, entitled Recommendation for Block Cipher Modes of Operation: The CCM Mode for Authentication and Confidentiality," is based on a method developed by Russ Housley, Doug Whiting, and Niels Ferguson. CCM uses the Advanced Encryption Standard (AES) in Cipher Block Chaining mode with a cryptographic key to generate a MAC from the message to be encrypted (i.e., the plaintext). The MAC is concatenated with the plaintext, divided into blocks, and combined with the outputs of an AES configured in counter mode, where the AES is under the influence of the cryptographic key and additional data. The additional data is data that is required to be authenticated but not encrypted. The combination function is an exclusive-or (XOR) function. The resulting encrypted message (i.e., ciphertext) and MAC are concatenated with the additional data and sent to a recipient. The recipient, who must have the same cryptographic key as the sender, separates the additional data from the ciphertext and uses the additional data to recover the plaintext and the MAC using the same scheme used to encrypt the plaintext. With the plaintext, the recipient generates a MAC using the same scheme as the sender. The generated MAC is compared to the received MAC. If they are the same then the recipient is assured that the plaintext is as the sender intended. The present invention does not require Cipher Block Chaining to generate a MAC.

In an article entitled "The Galois/Counter Mode of Operation (GCM)," dated May 31, 2005, authors David A. McGrew and John Viega disclose a method of authenticated encryption that generates a MAC using multiplication in a Galois Field. The present invention does not generate a MAC using multiplication in a Galois Field.

SUMMARY OF THE INVENTION

It is an object of the present invention to encrypt and authenticate a message and any additional information.

It is another object of the present invention to encrypt and authenticate a message and authenticate any additional information in a manner that is cryptographically strong and efficient to implement.

The present invention is a device for and method of encrypting a message that enables a recipient to authenticate the message.

The device for encrypting a message includes a first concatenator and a second concatenator.

A first block cipher is connected to the first concatenator, and a second block cipher is connected to the second concatenator.

A third concatenator is connected to the first block cipher and the second block cipher.

A fourth concatenator is connected to the third concatenator.

A hash engine is connected to the fourth concatenator.

A fifth concatenator is connected to the hash engine.

A divider is connected to the fifth concatenator.

The device includes a sixth concatenator.

A third block cipher is connected to the sixth concatenator.

A combiner is connected to the divider and the third block cipher.

A seventh concatenator, has a first input connected to combiner.

The first step of the encryption method is selecting a cryptographic key size between the sender and recipient.

The second step of the encryption method is establishing a cryptographic key between the sender and recipient of the size determined in the first step.

The third step of the encryption method is selecting a block cipher between the sender and the recipient.

The fourth step of the encryption method is selecting a hash function between the sender and the recipient.

The fifth step of the encryption method is selecting a first user-definable datum by the sender of a user-definable width.

The sixth step of the encryption method is concatenating the first user-definable datum with a second user-definable datum to a width of the selected block cipher.

The seventh step of the encryption method is concatenating the first user-definable datum with a third user-definable datum to the width of the selected block cipher.

The eighth step of the encryption method is encrypting the results of the sixth step and seventh step using the selected block cipher and the established cryptographic key.

The ninth step of the encryption method is concatenating the results of the eighth step with a fourth user-definable datum, if any, to an internal block size of the selected hash function.

The tenth step of the encryption method is concatenating the result of the ninth step with a message that the sender wishes to encrypt, and a fifth user-definable datum.

The eleventh step of the encryption method is hashing the result of the tenth step using the selected hash function.

The twelfth step of the encryption method is concatenating the result of the eleventh step with the message, if any.

The thirteenth step of the encryption method is dividing the result of the twelfth step into as many blocks as possible that are each as wide as the selected block cipher.

The fourteenth step of the encryption method is concatenating the first user-definable datum with a sixth user-definable datum to the width of the selected block cipher.

The fifteenth step of the encryption method is generating a number of key-stream blocks using the selected block cipher in a user-definable mode, where the result of the fourteenth step is the input to the block cipher, where the selected cryptographic key is used as such in the block cipher, and where the number of key-stream blocks generated is equal to the number of blocks resulting from the thirteenth step.

The sixteenth step of the encryption method is combining the key-stream blocks with the blocks resulting from the thirteenth step, where the last key-stream block is reduced in width to match that of the last block resulting from the thirteenth step, if necessary.

The seventeenth step of the encryption method is concatenating the result of the sixteenth step with the first user-definable datum and the fifth user-definable datum.

The eighteenth step of the encryption method is sending the result of the seventeenth, step to the recipient.

The nineteenth step of the encryption method is making the second, third, fourth, and sixth datums known to the recipient.

The decryption device and method separates a received message into ciphertext, the first datum, and the fifth datum, if any. The ciphertext, first datum, sixth datum, and cryptographic key are used to decrypt the ciphertext. Technically, the decryption method is the same as the encryption method. The present method is configured so that performing the encryption method on ciphertext produces the associated plaintext and the hash value generated by the sender. The first datum, second datum, third datum, fourth datum, fifth datum, and plaintext are used to generate a hash value in the same manner as was done in the encryptor. The generated hash value is then compared to the received hash value. If they match then the recipient is assured that the plaintext and the fifth datum, if any, are as intended by the sender.

DETAILED DESCRIPTION

The present invention is a device for and method of encrypting and authenticating a message and authenticating any additional information. The present invention provides a cryptographically stronger authentication method, and is more efficient to implement, than the prior art.

Figure 1:
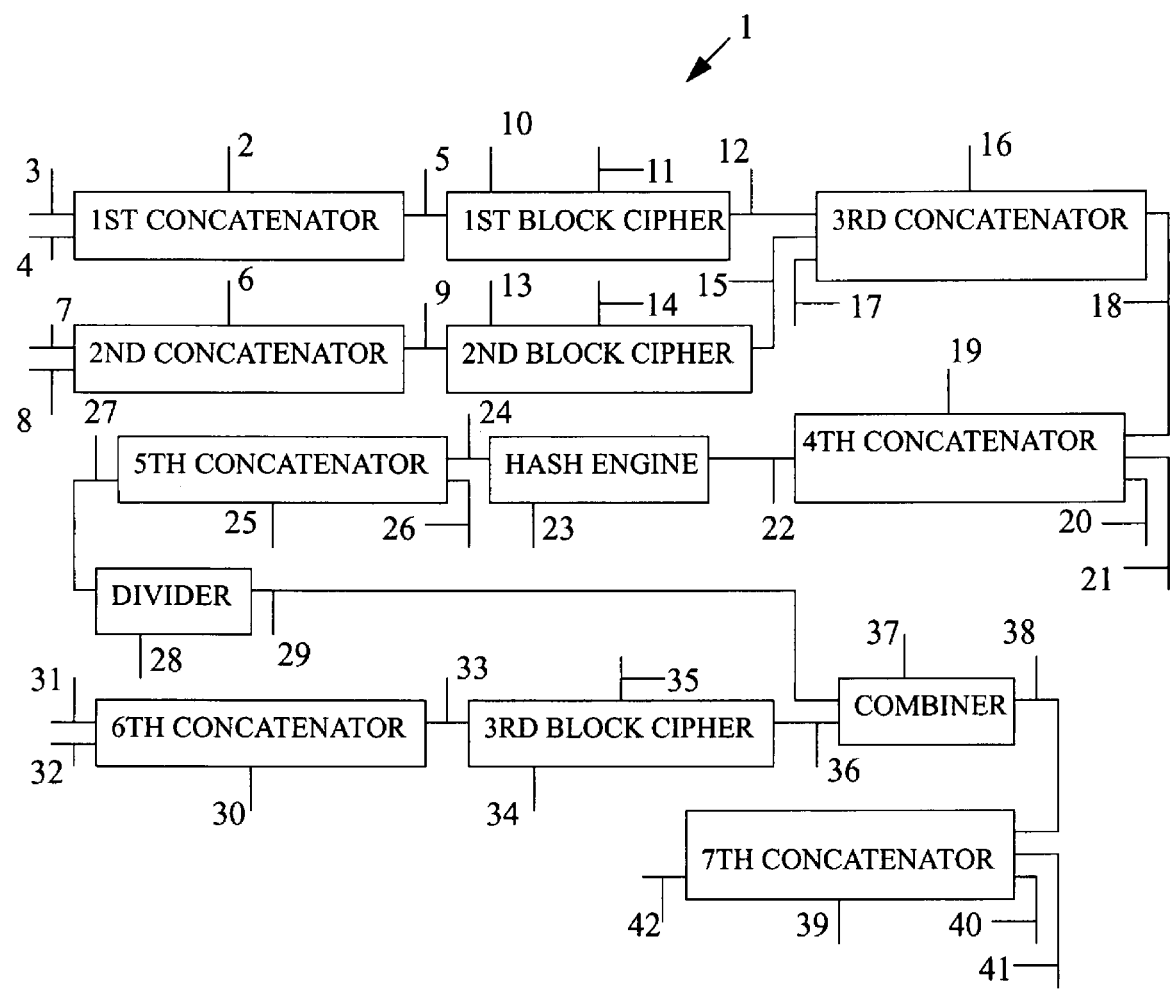
FIG. 1 is a schematic of the encryption device of the present invention.

FIG. 1 is a schematic of the encryption device 1 of the present invention.

The encryption device 1 includes a first concatenator 2, having a first input 3 for receiving a first user-definable datum, having a second input 4 for receiving a second user-definable datum, and having an output 5, which concatenates the first input 3 and the second input 4. Any concatenation scheme may be used in the encryption device 1.

The encryption device 1 includes a second concatenator 6, having a first input 7 for receiving the first user-definable datum, having a second input 8 for receiving a third user-definable datum, and having an output 9.

A first block cipher 10, has a first input 11 for receiving a cryptographic key, has a second input connected to the output 5 of the first concatenator 2, and has an output 12. In the preferred embodiment, the first block cipher 10 is an Advanced Encryption Standard (AES) block cipher. The size of the cryptographic key is user-definable. AES is disclosed in National Institute of Standards and Technology (NIST) Federal Information Processing Standard (FIPS) Publication (Pub) 197, which is hereby incorporated by reference into the specification of the present invention.

A second block cipher 13, has a first input 14 for receiving a cryptographic key, has a second input connected to the output 9 of the second concatenator 6, and has an output 15. In the preferred embodiment, the second block cipher 13 is the same as the first block cipher 10 and uses the same cryptographic key.

A third concatenator 16, has a first input connected to the output 12 of the first block cipher 10, has a second input connected to the output 15 of the second block cipher 13, has a third input 17 for receiving a fourth user-definable datum, and has an output 18.

A fourth concatenator 19, has a first input connected to the output 18 of the third concatenator 16, has a second input 20 for receiving a message to be encrypted, if any, has a third input 21 for receiving a fifth user-definable datum, if any, and has an output 22.

A hash engine 23, has a first input connected to the output 22 of the fourth concatenator 19, and has an output 24. In the preferred embodiment, the hash engine 23 is selected from the Secure Hash Algorithm Version 2 (SHA-2) family of hash engines, which include SHA224, SHA256, SHA384, and SHA512. The last three digits in each hash engine name indicate the width of the output of that hash engine. A SHA-2 hash engine accepts an input of varying size, but processes it in accordance with a specific internal block size (i.e., 512 bit block for SHA224 and SHA256 and 1024 bit block for SHA384 and SHA512). The size of the cryptographic key and the choice of hash engine defines the security of the encryption device 1, which is the minimum of the size of the cryptographic key and half of the hash engine output. SHA-2 is disclosed in NIST FIPS Pub 180-2, which is hereby incorporated by reference into the specification of the present invention.

A fifth concatenator 25, has a first input connected to the output 24 of the hash engine 23, has a second input 26 for receiving the message to be encrypted, if any, and has an output 27.

A divider 28, has a first input connected to the output 27 of the fifth concatenator 25, and has an output 29. The divider 28 divides the output 27 of the fifth concatenator 25 into the most blocks having the width of the output of a third block cipher 34, described below, plus a remainder block, if any, of a lesser width.

A sixth concatenator 30, has a first input 31 for receiving the first user-definable datum, has a second input 32 for receiving a sixth user-definable datum, and has an output 33.

The third block cipher 34, has a first input 35 for receiving a cryptographic key, has a second input connected to the output 33 of the sixth concatenator 30, and has an output 36. In the preferred embodiment, the third block cipher 34 is the same as the first block cipher 10 and uses the same cryptographic key.

A combiner 37, has a first input connected to the output 29 of the divider 28, has a second input connected to the output 36 of the third block cipher 34, and has an output 38. In the preferred embodiment, the combiner 37 is an exclusive-or function that can receive inputs that are as wide as those of the first block cipher 10.

A seventh concatenator 39, has a first input connected to the output 38 of the combiner 37, has a second input 40 for receiving the first user-definable datum, has a third input 41 for receiving the fifth user-definable datum, and has an output 42.

Figure 2:
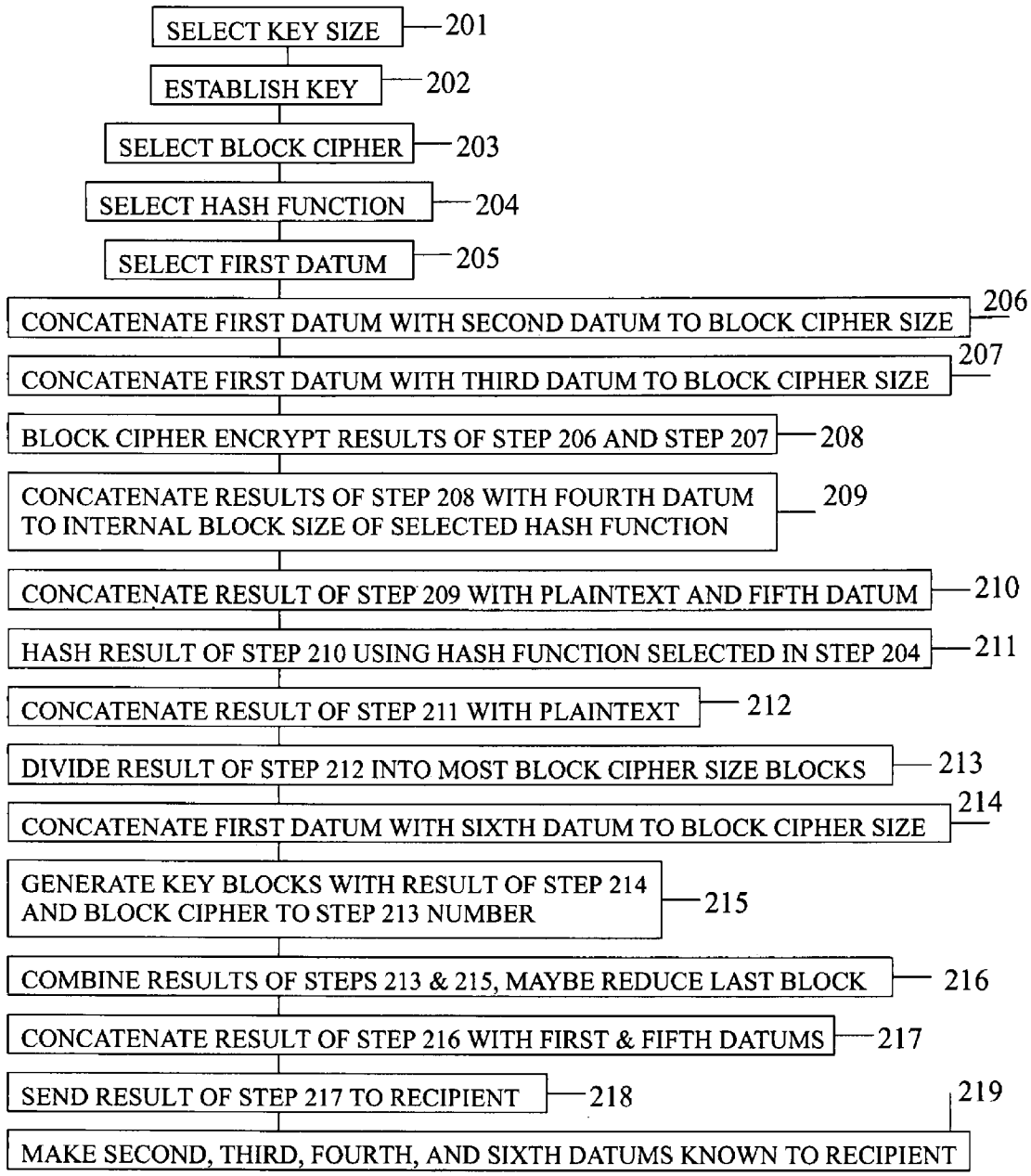
FIG. 2 is a flowchart of the encryption method of the present invention.

FIG. 2 is a flowchart of the encryption method of the present invention.

The first step 201 of the encryption method is selecting a cryptographic key size between the sender and recipient. In the preferred embodiment, key size is selected from the group of key sizes including 128, 192, and 256. However, any sufficient key size may be used.

The second step 202 of the encryption method is establishing a cryptographic key between the sender and recipient of the size determined in the first step 201.

The third step 203 of the encryption method is selecting a block cipher function between the sender and the recipient. In the preferred embodiment, the block cipher function is a block cipher that implements AES, has a block size of 128 bits, and uses a cryptographic key size of 128, 192, or 256 bits.

The fourth step 204 of the encryption method is selecting a hash function between the sender and the recipient. In the preferred embodiment, the hash function is selected from the Secure Hash Algorithm Version 2 (SHA-2) family of hash functions, which include SHA224, SHA256, SHA384, and SHA512.

The fifth step 205 of the encryption method is selecting a first user-definable datum by the sender of a user-definable width. The first user-definable datum is commonly referred to as an initialization vector or nonce. The first user-definable datum must be unique for each message encrypted using the same cryptographic key. Otherwise, the security of the present method could be compromised. The first user-definable datum need not be random, but may be, so long as it is unique for each message encrypted using the same cryptographic key. In the preferred embodiment, the width of the first user-definable datum is half that of the selected block cipher. The first user-definable datum is sent to the recipient on a per encrypted message basis as described below.

The sixth step 206 of the encryption method is concatenating the first user-definable datum with a second user-definable datum to the width of the selected block cipher. In the preferred embodiment, the width of the second user-definable datum is equal to that of the first user-definable datum and consists of all ones. The second user-definable datum is either pre-told to, or pre-negotiated with, the recipient.

The seventh step 207 of the encryption method is concatenating the first user-definable datum with a third user-definable datum to the width of the selected block cipher. In the preferred embodiment, the width of the third user-definable datum is equal to that of the first user-definable datum and consists of all zeros. The third user-definable datum is either pre-told to, or pre-negotiated with, the recipient.

The eighth step 208 of the encryption method is encrypting the results of the sixth step 206 and seventh step 207 using a block cipher and the established cryptographic key. In the preferred embodiment, the selected block cipher implements AES. However, any other suitable block cipher may be used.

The ninth step 209 of the encryption method is concatenating the results of the eighth step 208 with a fourth user-definable datum, if any, so that the result is as wide as the internal block size of the selected hash function. In the preferred embodiment, the fourth user-definable datum consists of all zeros. The fourth user-definable datum is either pre-told to, or pre-negotiated with, the recipient.

The tenth step 210 of the encryption method is concatenating the result of the ninth step 209 with a message that the sender wishes to encrypt, and a fifth user-definable datum. The fifth user-definable datum is a datum that is to be authenticated but either need not be sent in encrypted form or must be sent in unencrypted form, such as an address, a port number, a sequence number, or other information concerning a communication protocol. The fifth user-definable datum may be null. In addition, the message may be null when the fifth user-definable datum exists. In such a case, the present invention authenticates only the fifth user-definable datum. The fifth user-definable datum, if any, is sent to the recipient on a per encrypted message basis as described below.

The eleventh step 211 of the encryption method is hashing the result of the tenth step 210 using the hash function selected in the fourth step 204.

The twelfth step 212 of the encryption method is concatenating the result of the eleventh step 211 with the message (i.e., plaintext), if any.

The thirteenth step 213 of the encryption method is dividing the result of the twelfth step 212 into as many blocks as possible that are as wide as the selected block cipher plus a remainder block, if any, of a lesser width.

The fourteenth step 214 of the encryption method is concatenating the first user-definable datum with a sixth user-definable datum to the width of the selected block cipher. The sixth user-definable datum is either pre-told to, or pre-negotiated with, the recipient.

The fifteenth step 215 of the encryption method is using the selected block cipher in a user-definable mode to generate a number of key-stream blocks, where the result of the fourteenth step 214 is the input to the block cipher, where the selected cryptographic key is used as such in the block cipher, and where the number of key-stream blocks generated is equal to the number of blocks resulting from the thirteenth step 213. In the preferred embodiment, the block cipher is AES, and the user-definable mode is counter mode.

The sixteenth step 216 of the encryption method is combining the key-stream blocks resulting from the fifteenth step 215 with the blocks resulting from the thirteenth step 213, where the last key-stream block is reduced in width to match that of the last block resulting from the thirteenth step 213, if necessary. In the preferred embodiment, the combination function is exclusive-or (XOR). If the last key-stream block is reduced in size, the preferred method is to discard the required number of least significant bits (LSB) from the key-stream block, leaving its most significant bits.

The seventeenth step 217 of the encryption method is concatenating the result of the sixteenth step 216 with the first user-definable datum and the fifth user-definable datum.

The eighteenth step 218 of the encryption method is sending the result of the seventeenth step 217 to the recipient.

The nineteenth step 219 of the encryption method is making the second user-definable datum, third user-definable datum, fourth user-definable datum, and sixth user-definable datum known to the recipient. The datums may be made known in any sufficient manner (e.g., previously disclosed, generated in a known manner from a known starting point, etc.).

Figure 3:
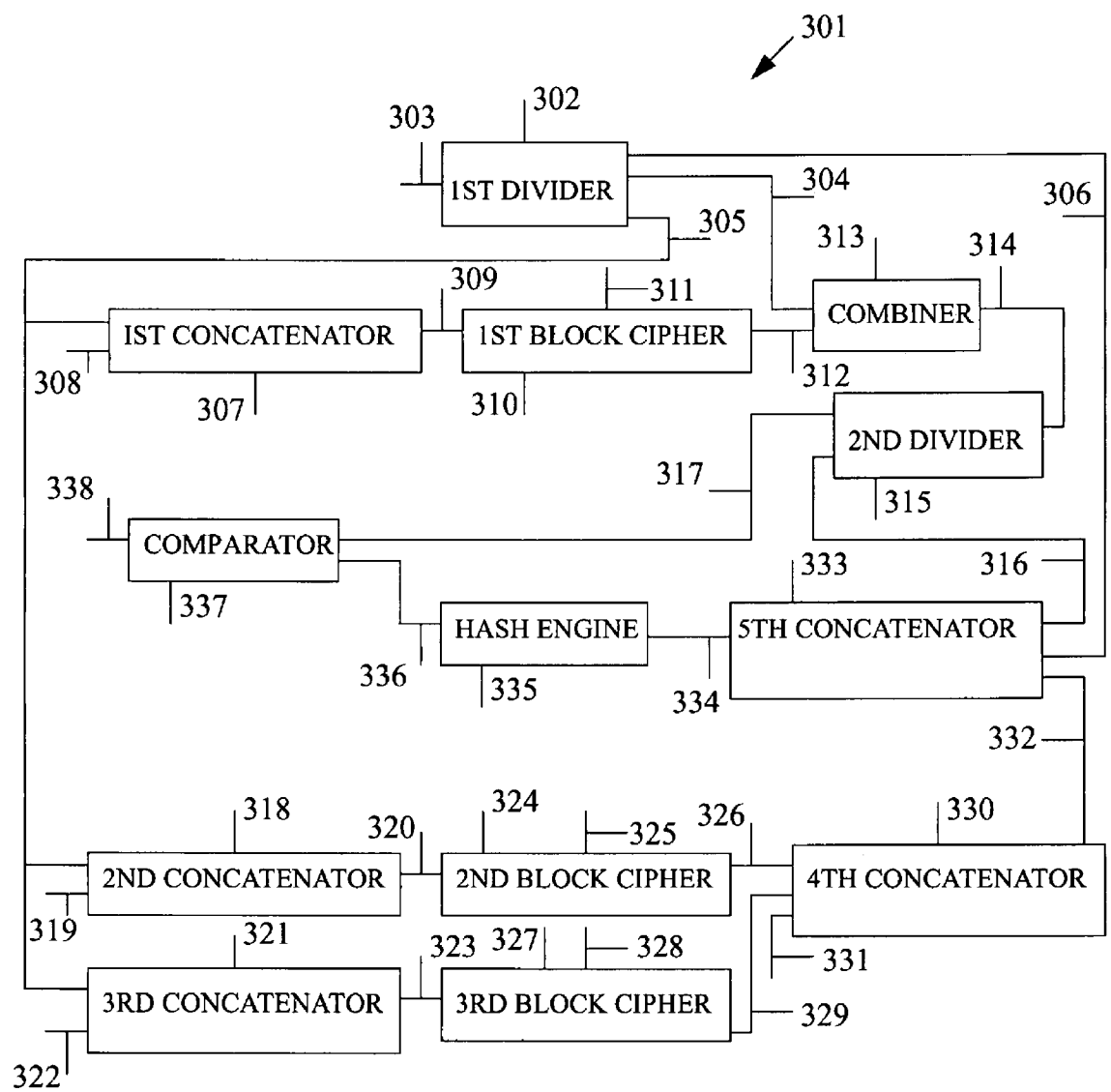
FIG. 3 is a schematic of the decryption device of the present invention.

FIG. 3 is a schematic of the decryption device 301 of the present invention.

The decryption device 301 includes a first divider 302, having a first input 303 for receiving a transmission from a sender, having a first output 304 at which appears an encrypted message sent by the sender divided into blocks equal in width to that of the third block cipher 34 in FIG. 1, a second output 305 in FIG. 2 at which appears a first user-definable datum sent by the sender, and a third output 306 at which appears a fifth user-definable datum, if any, sent by the sender.

A first concatenator 307, has a first input connected to the second output 305 of the first divider 302 for receiving the first user-definable datum, has a second input 308 for receiving the sixth user-definable datum described above, and has an output 309.

A first block cipher 310, has a first input 311 for receiving a cryptographic key, has a second input connected to the output 309 of the first concatenator 307, and has an output 312. In the preferred embodiment, the first block cipher 310 is the same as the first block cipher 10 in the encryption device of FIG. 1 and uses the same cryptographic key.

A combiner 313, in FIG. 3, has a first input connected to the first output 304 of the first divider 302, has a second input connected to the output 312 of the first block cipher 310, and has an output 314. In the preferred embodiment, the combiner 313 is an exclusive-or function that can receive inputs that are as wide as the first block cipher 310. The concatenation of the plaintext message and the hash value generated by the encryption device 1 in FIG. 1 appears at the output 314 of the combiner 313 in FIG. 3.

A second divider 315, has an input connected to the output 314 of the combiner 313, has a first output 316 at which appears the plaintext message, and has a second output 317 at which appears the hash value generated by the encryption device 1 in FIG. 1.

A second concatenator 318, in FIG. 3, has a first input connected to the second output 305 of the first divider 302, has a second input 319 for receiving the second user-definable datum, and has an output 320.

A third concatenator 321, has a first input connected to the second output 305 of the first divider 302, has a second input 322 for receiving a third user-definable datum, and has an output 323.

A second block cipher 324, has a first input 325 for receiving a cryptographic key, has a second input connected to the output 320 of the second concatenator 318, and has an output 326. In the preferred embodiment, the second block cipher 324 is the same as the first block cipher 310 and uses the same cryptographic key.

A third block cipher 327, has a first input 328 for receiving a cryptographic key, has a second input connected to the output 323 of the third concatenator 321, and has an output 329. In the preferred embodiment, the third block cipher 327 is the same as the first block cipher 310 and uses the same cryptographic key.

A fourth concatenator 330, has a first input connected to the output 326 of the second block cipher 324, has a second input connected to the output 329 of the third block cipher 327, has a third input 331 for receiving a fourth user-definable datum, and has an output 332.

A fifth concatenator 333, has a first input connected to the third output 306 of the first divider 302, has a second input connected to the first output 316 of the second divider, has a third input connected to the output 332 of the fourth concatenator 330, and has an output 334.

A hash engine 335, has a first input connected to the output 334 of the fifth concatenator 333, and has an output 336. The hash engine 335 is the same as the hash engine 23 in FIG. 1.

A comparator 338, in FIG. 3, has a first input connected to the second output 317 of the second divider 315, has a second input connected to the output 336 of the hash engine 335, and has an output 338.

Figure 4:
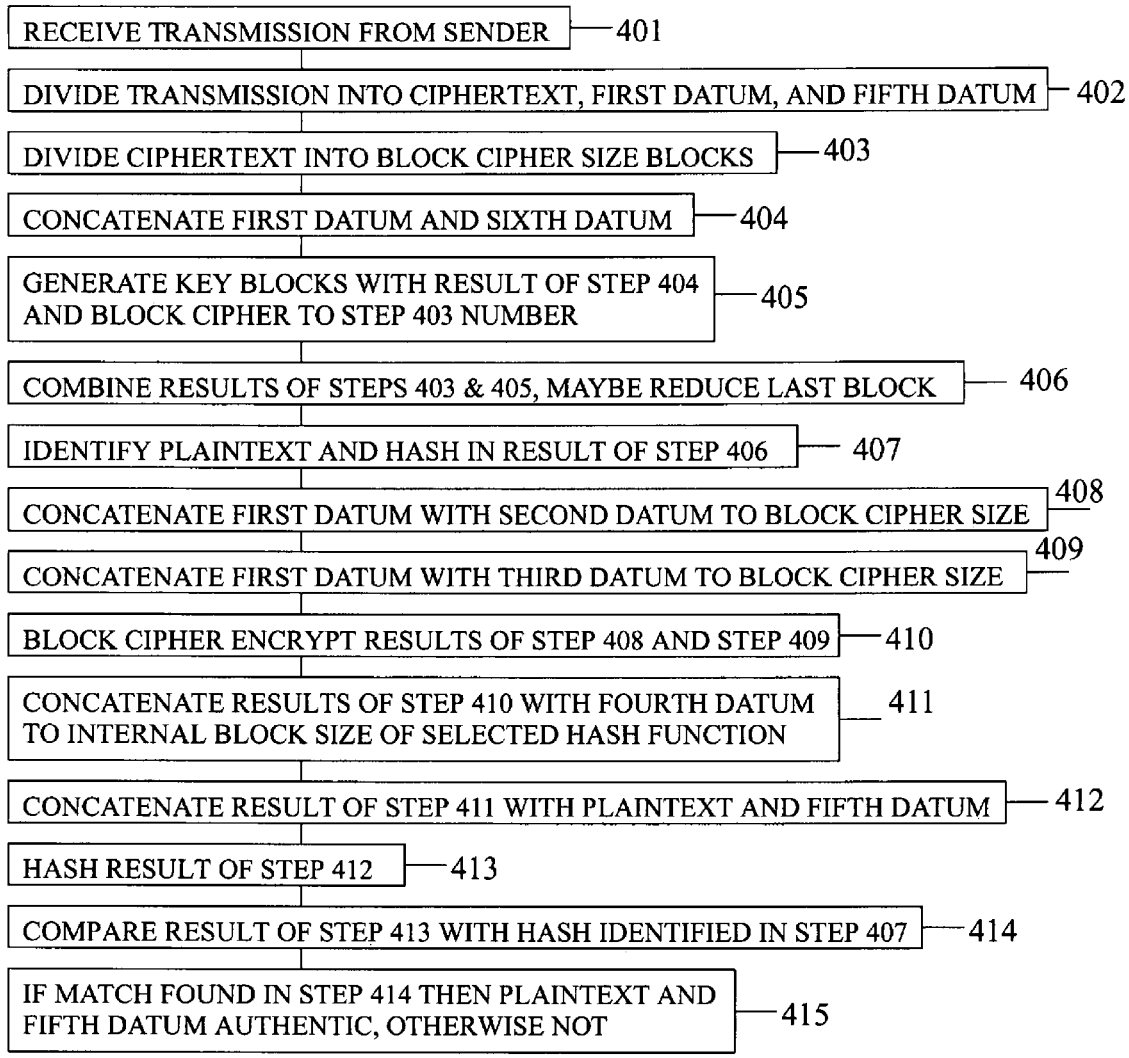
FIG. 4 is a flowchart of the decryption method of the present invention.

FIG. 4 is a flowchart of the decryption method of the present invention.

The first step 401 of the decryption method is receiving a transmission from a sender.

The second step 402 of the decryption method is dividing the received transmission into ciphertext sent by the sender, the first datum used by the sender, and the fifth datum used by the sender.

The third step 403 of the decryption method is dividing the ciphertext into blocks, where the block size is equal to that of the block cipher used by the sender in the fifteenth step 215 in FIG. 2.

The fourth step 404 of the decryption method in FIG. 4 is concatenating the first datum and the sixth datum. The sixth datum was previously made known to the recipient of the transmission.

The fifth step 405 of the decryption method is generating a number of key-stream blocks using a block cipher in a user-definable mode, where the result of the fourth step 404 is the input to the block cipher, where the selected cryptographic key is used as such in the block cipher, and where the number of key-stream blocks generated is equal to the number of blocks resulting from the third step 403. In the preferred embodiment, the block cipher and its mode are the same as those used by the sender in the fifteenth step 215 of FIG. 2.

The sixth step 406 of the decryption method in FIG. 4 is combining the key-stream blocks resulting from the fifth step 405 with the blocks resulting from the third step 403, where the last key-stream block is reduced in width to match that of the last block resulting from the third step 403, if necessary. In the preferred embodiment, the combination function is the same as that used by the sender. If the last key-stream block is reduced in size, it is reduced in the same manner employed by the sender.

The seventh step 407 of the decryption method is identifying, in the result of the sixth step 406, the plaintext and hash value generated by the sender.

The eighth step 408 of the decryption method is concatenating the first user-definable datum with the second user-definable datum. The second user-definable datum was made known to the recipient as described above and in FIG. 2.

The ninth step 409 of the decryption method is concatenating the first user-definable datum with a third user-definable datum.

The tenth step 410 of the decryption method is encrypting the results of the eighth step 408 and the ninth step 409 using the cryptographic key established in the second step 202 in FIG. 2 and the block cipher selected in the third step 203.

The eleventh step 411 of the decryption method in FIG. 4 is concatenating the results of the tenth step 410 with the fourth user-definable datum. The fourth user-definable datum was made known to the recipient.

The twelfth step 412 of the decryption method is concatenating the result of the eleventh step 411 with the plaintext message identified in the seventh step 407, and the fifth user-definable datum identified in the second step 402.

The thirteenth step 413 is hashing the result of the twelfth step 412 using the same hash function used by the sender.

The fourteenth step 414 of the method is comparing the result of the thirteenth step 413 with the hash value identified in the seventh step 407.

The fifteenth step 415 of the method is determining that the plaintext and the fifth user-definable datum, if any, received are as the sender intended if the result of the fourteenth step 414 is a match. Otherwise, they are not as the sender intended and should be disregarded.

What is claimed is:

1. A device for authenticated encryption, comprising:
   a) a first hardware concatenator, having a first input, having a second input, and having an output;
   b) a second hardware concatenator, having a first input, having a second input, and having an output;
   c) a first hardware block cipher, having a first input for receiving a cryptographic key, having a second input connected to the output of the first hardware concatenator, and having an output;
   d) a second hardware block cipher, having a first input for receiving a cryptographic key, having a second input connected to the output of the second hardware concatenator, and having an output;
   e) a third hardware concatenator, having a first input connected to the output of the first hardware block cipher, having a second input connected to the output of the second hardware block cipher, having a third input, and having an output;
   f) a fourth hardware concatenator, having a first input connected to the output of the third hardware concatenator, having a second input for receiving a message to be encrypted, having a third input, and having an output;
   g) a hardware hash engine, having a first input connected to the output of the fourth hardware concatenator, and having an output;
   h) a filth hardware concatenator, having a first input connected to the output of the hardware hash engine hardware concatenator, having a second input for receiving the message to be encrypted, and having an output;
   i) a hardware divider, having a first input connected to the output of the filth hardware concatenator, and having an output;
   j) a sixth hardware concatenator, having a first input, having a second input, and having an output;
   k) a third hardware block cipher, having a first input for receiving a cryptographic key, having a second input connected to the output of the sixth hardware concatenator, and having an output;
   l) a hardware combiner, having a first input connected to the output of the hardware divider, having a second input Connected to the output of the third hardware block cipher, and having an output; and
   m) a seventh hardware concatenator, having a first input connected to the output of the hardware combiner, having a second input, having a third input, and having an output.

2. The device of claim 1, wherein each hardware block cipher is comprised of a hardware block cipher that implements the Advanced Encryption Standard.

3. The device of claim 1, wherein said hardware hash engine is a hardware hash engine that implements a hash function from the Secure Hash Algorithm Version 2 family of hash functions, where an internal block size is selected from the group of internal block sizes comprising 512 bits and 1024 bits.

4. A method of authenticated encryption, comprising the steps of:
   a) selecting a cryptographic key size between a sender and a recipient;
   b) establishing a cryptographic key between the sender and the recipient of the size selected in step (a);
   c) selecting a block cipher between the sender and recipient;
   d) selecting a hash function between the sender and the recipient, where the selected hash function has an internal block size;
   e) selecting a first user-definable datum;
   f) concatenating the first user-definable datum with a second user-definable datum to a width of the selected block cipher;
   g) concatenating the first user-definable datum with a third user-definable datum to the width of the selected block cipher;
   h) encrypting the results of step (f) and step (g) using the selected block cipher and the established cryptographic key;
   i) concatenating the results of step (h) with a fourth user-definable datum to the internal block size of the selected hash function;
   j) concatenating the result of step (i) with a message that the sender wants to encrypt and a fifth user-definable datum;
   k) hashing the result of step (j) using the selected hash function;
   l) concatenating the result of step (k) with the message;
   m) dividing the result of step (l) into as many blocks as possible that are as wide as the selected block cipher and a remainder, if any, of a lesser width;

n) concatenating the first user-definable datum with a sixth user-definable datum to the width of the selected block cipher;

o) generating key-stream blocks using the selected block cipher in a user-definable mode and the established cryptographic key, where the result of step (n) is the input, and where the number of key-steam blocks equals the number of blocks resulting from step (m);

p) combining the results of step (m) and step (o), where the last key-stream block is reduced in width, if necessary, to match that of the last block of step (m);

q) concatenating the result of step (p) with the first user-definable datum and the fifth user-definable datum;

r) sending the result of step (q) to the recipient; and s) making the second user-definable datum, third user-definable datum, fourth user-definable datum, and sixth user-definable datum known to the recipient;

wherein steps (a)-(s) are performed on a computing device.

5. The method of claim 4, wherein said step of selecting a cryptographic key size between a sender and a recipient is comprised of selecting a cryptographic key size from the group of key sizes consisting of 128 bits, 192 bits, and 256 bits.

6. The method of claim 4, wherein said step of selecting a hash function between the sender and the recipient is comprised of selecting a hash function from the Secure Hash Algorithm Version 2 family of hash functions having an internal block size selected from the group of internal block sizes consisting of 512 bits and 1024 bits.

7. The method of claim 4, wherein said step of concatenating the first user-definable datum with a second user-definable datum to a width of the selected block cipher is comprised of concatenating the first user-definable datum with ones to the width of the selected block cipher.

8. The method of claim 4, wherein said step of concatenating the first user-definable datum with a third user-definable datum to the width of the selected block cipher is comprised of concatenating the first user-definable datum with zeros to the width of the selected block cipher.

9. The method of claim 4, wherein said step of encrypting the results of step (f) and step (g) using a block cipher and the established cryptographic key is comprised of encrypting the results of step (f) and step (g) using a block cipher that implements the Advanced Encryption Standard.

10. The method of claim 4, wherein said step of concatenating the result of step (h) with a fourth user-definable datum to the internal block size of the selected hash function is comprised of concatenating the result of step (h) with zeros to the internal block size of the selected hash function.

11. The method of claim 4, wherein said step of generating key-stream blocks is comprised of generating key-stream blocks using a block cipher in counter mode that implements the Advanced Encryption Standard.

12. The method of claim 4, wherein said step of combining the results of step (m) and step (o), where the last key-stream block is reduced in width, if necessary, to match that of the last block of step (m) is comprised of Exclusive-ORing the results of step (m) and step (o), where the least significant bits of the last key-stream block are discarded, if necessary, to match the width of the last block of step (m).

13. A device for authenticated decryption, comprising:

a) a first hardware divider, having a first input for receiving a combination of ciphertext, a first user-definable datum, and a fifth user-definable datum; having a first output at which appears the ciphertext divided into blocks of width of a hardware block cipher used to generate the ciphertext, having a second output at which appears the first user-definable datum, and having a third output at which appears the fifth user-definable datum;

b) a first hardware concatenator, having a first input connected to the second output of the hardware divider, having a second input, and having an output;

c) a first hardware block cipher, having a first input for receiving a cryptographie key, having a second input connected to the output of the first hardware concatenator, and having an output;

d) a hardware combiner, having a first input connected to the first output of the first hardware divider, having a second input connected to the output of the first hardware block cipher, and having an output;

e) a second hardware divider, having an input connected to the output of the hardware combiner, having a first output at which appears plaintext, and having a second output at which appears a hash value generated by a sender;

f) a second hardware concatenator, having a first input connected to the second output of the first hardware divider, having a second input, and having an output;

g) a third hardware concatenator, having a first input connected to the second output of the first hardware divider, having a second input, and having an output;

h) a second hardware block cipher, having a first input for receiving a. cryptographic key, having a second input connected to the output of the second hardware concatenator, and having an output;

i) a third hardware block cipher, having a first input for receiving a cryptographic key, having a second input connected to the output of the third hardware concatenator, and having an output;

j) a fourth hardware concatenator, having a first input connected to the output of the second hardware block cipher, having a second input connected to the output of the third hardware block cipher, having a third input, and having an output;

k) a fifth hardware concatenator, having a first input connected to the third output of the first hardware divider, having a second input connected to the first output of the second hardware divider, having a third input connected to the output of the fourth hardware concatenator, and having an output;

l) a hardware hash engine, having a first input connected to the output of the fifth hardware concatenator, and having an output; and m) a hardware comparator, having a first input connected to the second output of the second hardware divider, having a second input connected to the output of the hardware hash engine, and having an output.

14. The device of claim 13, wherein each hardware block cipher is comprised of a hardware block cipher that implements the Advanced Encryption Standard.

15. The device of claim 13, wherein said hardware hash engine implements a hash function from the Secure Hash Algorithm Version 2 family of hash functions, where its internal block size is selected from the group of internal block sizes comprising 512 bits and 1024 bits.

16. A method of authenticated decryption, comprising the steps of a) receiving a transmission from a sender that includes ciphertext, a first user-definable datum, and a fifth user-definable datum;

b) dividing the transmission into ciphertext, first user-definable datum, and fifth user-definable datum;

c) dividing the ciphertext into blocks of width equal to that of the block cipher used to generate the ciphertext;

d) concatenating the first user-definable datum with a sixth user-definable datum to the width of the block cipher used by the sender;

e) generating key-stream blocks using a block cipher in a user-definable mode and an established cryptographic key, where the result of step (d) is the input, where the number of key-steam blocks equals the number of blocks resulting from step (c), and where the block cipher is the same as that used by the sender;

f) combining the results of step (c) and step (e), where the last key-stream block is reduced in width, if necessary, to match that of the last block of step (c);

g) identifying the plaintext and hash value in the result of step (f);

h) concatenating the first user-definable datum with a second user-definable datum to the width of the block cipher;

i) concatenating the first user-definable datum with a third user-definable datum to the width of the block cipher;

j) encrypting the results of step (h) and step (i) using the block cipher and the established cryptographic key;

k) concatenating the results of step (j) with a fourth user-definable datum to an internal block size of the hash function used by the sender;

l) concatenating the result of step (k) with the plaintext and the fifth user-definable datum;

m) hashing the result of step (l) using the same hash function used by the sender;

n) comparing the result of step (m) with the hash value identified in step (g); and o) determining that the plaintext and fifth user-definable datum are as the sender intended if a match is found in step (n), otherwise not;

wherein steps (a)-(o) are performed on a computing device.

17. The method of claim 16, wherein said step of concatenating the first user-definable datum with a second user-definable datum to the width of the block cipher is comprised of concatenating the first user-definable datum with ones to the width of the block cipher.

18. The method of claim 16, wherein said step of concatenating the first user-definable datum with a third user-definable datum to the width of the block cipher is comprised of concatenating the first user-definable datum with zeros to a width equal to that of the corresponding block cipher used by the sender.

19. The method of claim 16, wherein said step of concatenating the results of step (j) with a fourth user-definable datum to an internal block size of the hash function used by the sender is comprised of concatenating the results of step (j) with zeros to the internal block size of the hash function used by the sender.

20. The method of claim 16, wherein said step of generating key-stream blocks is comprised of generating key-stream blocks using a block cipher in counter mode that implements the Advanced Encryption Standard.

\* \* \* \* \*